United States Patent [19]

Rooney

[11] Patent Number: 5,481,809

[45] Date of Patent: Jan. 9, 1996

[54] LASER PLUMB BOB AND APPARATUS

[76] Inventor: Michael Rooney, 1409 SW. Lake Rd., Redmond, Oreg. 97756

[21] Appl. No.: 348,256

[22] Filed: Nov. 28, 1994

[51] Int. Cl.⁶ .................................................. G01C 15/10
[52] U.S. Cl. .......................... 33/392; 33/286; 33/DIG. 21
[58] Field of Search ............................. 33/273, 282, 283, 33/286, 296, 365, 366, 370, 373, 391, 392, 404, DIG. 21; 356/138

[56] References Cited

U.S. PATENT DOCUMENTS

| | | | |
|---|---|---|---|
| 1,952,745 | 3/1934 | Deasy | 33/370 |
| 3,909,952 | 10/1975 | Lagasse | 33/283 |
| 4,718,170 | 1/1988 | Wheeler | 33/391 |
| 5,163,229 | 11/1992 | Cantone | 33/286 |
| 5,400,132 | 3/1995 | Trepagnier | 356/138 |

FOREIGN PATENT DOCUMENTS 92007235  4/1992  WIPO .................................... 33/392

Primary Examiner—William A. Cuchlinski, Jr.
Assistant Examiner—G. Bradley Bennett
Attorney, Agent, or Firm—Richard E. Litman

[57] ABSTRACT

A laser plumb bob uses a conventional blumb bob body, hollowed to include a laser device therein. The laser device is affixed within the plumb bob body to preclude relative movement therebetween, to ensure accuracy for the device. With the use of a laser to provide a plumb line of coherent light which beam does not spread, the plumb bob may be suspended from a relatively short line in order to dampen oscillations more quickly. Apparatus providing for use of the plumb bob by a single person is also disclosed, comprising an upper fixture from which the plumb bob is suspended, an extension arm, and a target. The target and upper fixture may be connected by a telescoping column, if desired. The upper fixture may include a wind shield or guard, if desired, so provide greater stability for the plumb bob. The apparatus allows a single person to check plumb lines for walls and the like, thus providing greater efficiency and economy in building construction. The apparatus may also be used with a conventional plumb bob, if desired.

20 Claims, 6 Drawing Sheets

LASER PLUMB BOB AND APPARATUS

FIELD OF THE INVENTION

The present invention relates generally to devices used to determine a vertical line in the building construction trade and the like, and more specifically to a plumb bob utilizing a relatively short plumb line and laser device therein to project a laser beam to a target therebelow. The invention also resides in various apparatus used to position the plumb bob accurately, and further to provide an accurate target therefor.

BACKGROUND OF THE INVENTION

Devices for plumbing, or determining and forming a vertical line, have been used in the building and other trades since the earliest of times. Traditionally, these devices have basically consisted of nothing more than a weight suspended from a string or line, with the vertical line determined by gravity. More recently, various relatively complex plumbing and leveling devices have been developed, many of which rely upon the extremely narrow beam of a laser. However, these devices are generally quite costly, use bearings which develop at least some amount of friction which reduces their accuracy, require a relatively large amount of electrical power for operation, are prone to error due to numerous critically adjusted or set components which may be knocked or jarred out of alignment, and/or require a relatively skilled operator in order to produce accurate readings and to ensure proper handling of the apparatus in order to preclude damage thereto.

Accordingly, it has been recognized that simpler, less costly plumb bobs incorporating light means therein, may be valuable in such work. However, such lighted plumb bobs developed to this point rely upon an incandescent light source, which produces incoherent light which tends to spread even when focused through one or more lenses. As a result, such plumb bobs must be used conventionally close to the target and using a relatively long plumb line, in the manner of standard plumb bobs of long use. The only advantage of such lighted plumb bobs is their ability to be used in conditions of low light. However, the disadvantages of a relatively long plumb line, and the time required for oscillations to dampen, still remain.

The need arises for a plumb bob incorporating a relatively simple and low cost laser therein, which plumb bob may be suspended on a relatively short line at some distance from the target. The relatively short line provides relatively rapid damping of oscillations, and further provides for ease of protection from wind and other factors which might cause a conventional plumb line to oscillate. The extremely narrow laser beam provides great accuracy in determining the precise point vertically below the laser plumb bob, and is not affected by wind, diffusion of the light beam, or other factors. A further need exists for various devices or apparatus providing for the rapid deployment of a plumb bob and measurement of a vertical thereby, by a single person, thus freeing others to perform other tasks and reducing the labor costs involved in such plumbing operations.

DESCRIPTION OF THE PRIOR ART

U.S. Pat. No. 3,635,565 issued to George P. Colson on Jan. 18, 1972 discloses a Laser Vertical Collimator comprising a laser light source installed within a tube. The tube is in turn suspended by a spherical bearing having a concentric passage therethrough. The laser source may be reversed within the tube to project upwardly, if desired. While the Colson device offers additional versatility due to the reversibility of the light source within the tube, it is relatively costly and also prone to various problems, ranging from possible misalignment of the laser beam with the vertical, friction and/or damage to the spherical bearings, and further due to friction imposed by the relatively inflexible electrical connector between the top of the housing and the suspended laser source.

U.S. Pat. No. 3,771,876 issued to Erland S. Ljungdahl et al. on Nov. 13, 1973 discloses an apparatus for Producing A Plane Or Conical Optical Reference Surface comprising a laser or other light source which transmits a beam vertically downward to pass through a prism or lens. The light transmitting means is suspended by two leaves at right angles to one another, which leaves are able to bend in only a single plane each. The perpendicular axes provide the required pendulum mounting for the light source. However, Ljungdahl et al. rely upon the two leaves not only to suspend the light source, but also to act as a conductor for the required electrical power. Thus, each leaf is formed of a non-conductive center portion, sandwiched on each side by a conductor. The resulting construction would appear to be somewhat stiffer than the flexible line or string used with the present invention, and the entire apparatus is more complex.

U.S. Pat. No. 4,333,242 issued to Robert K. Genho, Sr. on Jun. 8, 1982 discloses a Construction Laser providing automatic leveling and projection of a laser beam in a horizontal direction. However, the device is exceedingly complex and costly in comparison to the present invention, and cannot project a beam vertically downward as required in plumbing operations. The various bearings, supports, automatic adjustments, etc., require constant inspection to confirm the accuracy of the device, whereas the present invention requires little, if any adjustment at any time.

U.S. Pat. No. 4,448,528 issued to Acie J. McManus on May 15, 1984 discloses a Portable Laser Vertical Collimator And Plumb Line Indicator comprising a dual laser projecting from opposite ends, 180 degrees opposed from one another and projecting upwardly and downwardly. The device is suspended by a gimbal which produces relatively greater friction than the string or line suspension of the present plumb bob and thus reduces accuracy. While the McManus device permits vertically upward and downward projections, if the laser device is misaligned, the error is effectively doubled due to the dual projection from a single laser device.

U.S. Pat. No. 4,597,186 issued to Peter Markos on Jul. 1, 1986 discloses a Lighted Plumb Bob comprising a conventional plumb bob body essentially housing a penlight or the like therewithin. The device uses a relatively small diameter passage for the light from the incandescent bulb therein to pass through, which small diameter passage serves to some extent to narrow the projected beam. However, in practice the Markos plumb bob "is suspended in a conventional manner . . . so that (the) tip . . . is approximately ¾ to one inch above the surface." (Col. 2, lines 44–47.) The present device uses a laser emitting a relatively long, narrow beam.

U.S. Pat. No. 4,625,428 issued to Gerald E. Griffin on Dec. 2, 1986 discloses a Lighted Plumb Bob generally similar to the Markos device discussed immediately above, but including a switch activated by the weight of the plumb bob suspended therefrom. The same limitations exist as with the Markos device, in that the incandescent bulb providing incoherent light cannot be focused to a pinpoint some distance away from the plumb bob, particularly without the use of lenses. If an attempt is made to narrow the light passage in the tip of the plumb bob to too great a degree, the result is similar to a pinhole camera, in that the light begins to spread again due to interference with the hole diameter. Accordingly, Griffin uses his plumb bob in the same manner as that of Markos, using "a line . . . of a conventional nature for plumb bobs . . . ." (col. 2, lines 53–54.) This is done to position the tip of the plumb bob relatively close to the target, in order to obviate the problem of beam spread with the incandescent light source.

U.S. Pat. No. 5,012,585 issued to Charlie J. DiMaggio on May 7, 1991 discloses a Laser Plumb Bob Apparatus in which a single laser is used to project a beam upwardly and downwardly, so the device may be suspended between floor and ceiling to provide a plumb line therebetween, in the manner of the McManus device discussed further above. The device includes a spherical center portion, which is suspended within a concave spherical ring. The possibility of misalignment of the lenses, as well as the bearing friction of the spherical central portion and its supporting ring, would appear to require considerable care in alignment and the possibility of instrument error occurring, which problems are largely precluded by the present plumb bob invention.

U.S. Pat. No. 5,075,977 issued to Joseph F. Rando on Dec. 31, 1991 discloses an Automatic Plumb Bob And Level Tool utilizing a single laser therewithin and projecting a beam to a mirror which is mounted on a compensating spring, thus permitting the device to be used to project either a horizontal or vertical beam and to adjust automatically for non-level surfaces upon which it is placed. No provision is made for suspending the device from a line or other means of suspension. The weight and compensating spring must be carefully calibrated for accuracy, and the pivotally mounted laser may be knocked out of alignment with hard use. The present plumb bob has no moving parts or components which require adjustment, or which may be misaligned.

Finally, European Patent No. 341,812 to Spectra-Physics Inc. and published on Nov. 15, 1989 discloses a Level/Plumb Indicator With Tilt Compensation. The mechanism of the device is somewhat related to the device of the Rando patent discussed immediately above, and in fact one of the co-inventors of the Spectra-Physics European Patent is Rando. Accordingly, the same potential drawbacks exist in the Spectra-Physics device, i.e., mirrors and/or lenses suspended by various means, each of which can lead to misalignment problems which are obviated by the present invention.

None of the above noted patents, taken either singly or in combination, are seen to disclose the specific arrangement of concepts disclosed by the present invention.

SUMMARY OF THE INVENTION

By the present invention, an improved laser plumb bob and apparatus is disclosed.

Accordingly, one of the objects of the present invention is to provide an improved laser plumb bob and apparatus which includes a conventional plumb bob body which has been hollowed to provide for the permanent and immovable installation of a laser therein, which laser is capable of projecting a narrow, coherent light beam vertically downward to provide a laser plumb line when the laser plumb bob is conventionally suspended.

Another of the objects of the present invention is to provide an improved laser plumb bob and apparatus which plumb bob is adapted to use a relatively short suspension line or string and to be suspended at a relatively great distance above the plumb target.

Yet another of the objects of the present invention is to provide an improved laser plumb bob and apparatus which plumb bob precludes need for adjustment and obviates erroneous readings, due to the lack of lenses and moving parts therein.

Still another of the objects of the present invention is to provide an improved laser plumb bob and apparatus which includes extension devices and cooperating targets, which provide for operation and use by a single person, thus providing greater economy and efficiency in construction.

A further object of the present invention is to provide an improved laser plumb bob and apparatus which may include a telescoping pole or column, having a laser plumb bob suspended at the upper end thereof and a cooperating target secured to the opposite lower end thereof.

An additional object of the present invention is to provide an improved laser plumb bob and apparatus which may include a wind shield providing shielding for the plumb bob as it is suspended adjacent its suspension point.

Another object of the present invention is to provide an improved laser plumb bob and apparatus which requires no special training or technique on the part of the user thereof.

A final object of the present invention is to provide an improved laser plumb bob and apparatus for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
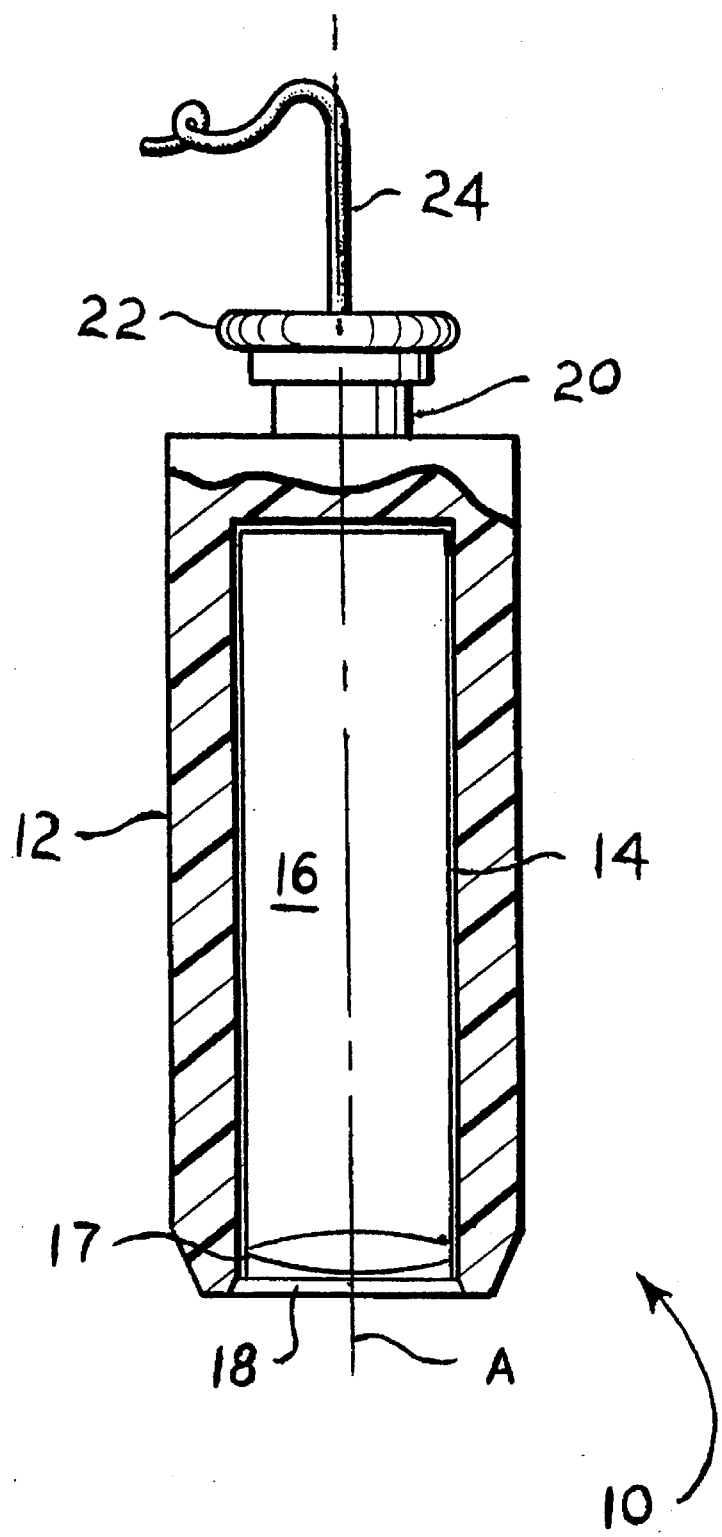
FIG. 1 is partially sectioned elevation view, showing the laser plumb bob of the present invention.

Referring now to the drawings, the present invention will be seen to relate to a laser plumb bob and an apparatus therefor providing for the plumbing of vertical lines by a single person. FIG. 1 discloses an elevation view in partial section of a laser plumb bob 10, showing its general configuration. The laser plumb bob 10 comprises a body portion 12 having an interior cavity 14 therein. The interior cavity 14 is adapted for the fixed installation of a laser device 16 therein. (Details of the laser device 16, electrical batteries therefor, etc., are not disclosed, as the laser device 16 is conventional in nature. Such devices are disclosed in the prior art discussed above, or alternatively, other laser devices for other purposes, e.g., laser pointers and the like, may be used in combination with the present laser plumb bob 10.) A lens element (or multiple elements) 17 may be provided as required, to provide for the sharper focus of the laser beam at relatively long distances from the plumb bob apparatus 10. The lens element(s) 17 may be provided with adjustability, if desired, in order to provide the sharpest and most accurate focus for the laser beam at varying distances, according to the specific requirements of the particular plumbing operation. Provision of a virtually "pinpoint" light at the target or object, will be seen to provide an easily recognized point even in relatively bright conditions, particularly with colored lasers.

Figure 2:
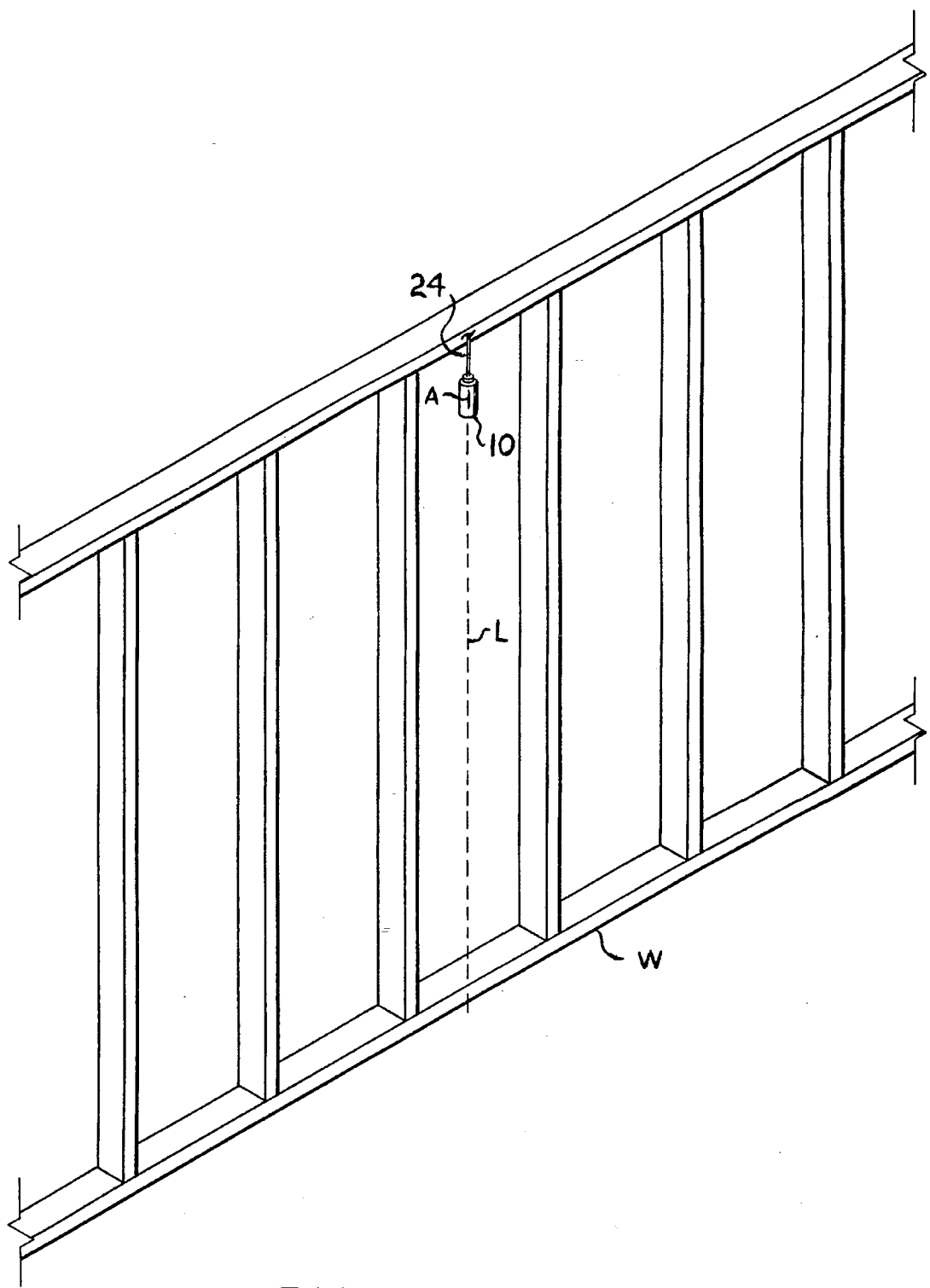
FIG. 2 is a perspective view of the laser plumb bob of FIG. 1, in use providing a plumb line along a frame wall.

The laser plumb bob 10 includes an open lower end 18 having the same diameter as the interior cavity 14, providing for the projection of a laser beam or laser plumb line L therefrom, as shown in FIG. 2 and other figures. The opposite upper end 20 of the laser plumb bob 10 includes plumb line attachment means 22, whereby a relatively short plumb line 24 may be secured to the laser plumb bob 10. The opposite upper end 20 and lower end 18 define a length therebetween, which is conventional in nature with the exception of the truncated lower end 18 providing for the insertion of the laser device 16 therein. It will be seen that a sharp point or the like is not required for the present laser plumb bob 10, as the laser plumb line L itself provides a sharp projected beam, due to the coherent nature of the light emitted by the laser device 16.

Precise alignment of the laser line L is provided by precise assembly of the laser device 16 within the plumb bob body 12. As the axis of the plumb line or string 24 is concentric with the longitudinal axis A of the plumb bob body 12, and the laser device 16 is installed within the plumb bob body cavity 14 so that the projected beam L is coaxial with the longitudinal axis A of the plumb bob body 12, a laser line L projected by the laser device 16 will fall along a precise vertical line when the plumb bob 10 is suspended from the plumb line or string 24. As the coherent light of the laser line L may extend a relatively great distance from the laser device 16 without spreading, to provide a pinpoint of light at a target some distance away, the blumb bob 10 may be suspended from a relatively short length of line 24; it is not necessary to have the laser plumb bob 10 suspended immediately adjacent the target, as with conventional plumb bobs.

The use of a relatively short string or line 24 has definite advantages over the prior art, in that the period of oscillation of the plumb bob pendulum is much more rapid with a shorter line, and will therefore pendulum oscillations will dampen out more quickly. Also, the shorter length of the line or string 24 makes it much easier to protect the laser plumb bob 10 and the line 24 from wind when plumbing incomplete structures exposed to wind and the outdoor environment, as will be discussed further below. Any shortening of the line 24 will have some benefit, even a line length less than half the vertical distance, but preferably the length of the line 24 is no greater than the length of the plumb bob body 12 in order to maximize the advantages of the present invention.

FIG. 2 shows the present laser plumb bob 10 in use in plumbing a wall frame structure W. As discussed above, the line 24 from which the plumb bob body 12 is suspended may be relatively short, on the order of the length of the plumb bob body 12 or even less. The concentricity of the plumb bob body suspension line 24, the plumb bob body 12 with the laser device 16 concentrically housed therein, and the laser line L projected from the laser device 16, serve to cause the laser line L to be projected along the same path which would be described by a longer plumb bob string or line if the plumb bob were to be lowered adjacent the bottom of the wall, as is done conventionally. The pinpoint of light projected by the laser device 16 defines a spot precisely vertically below the center of the laser plumb bob 10, when the plumb bob 10 is in a steady position with no oscillations. The pinpoint of laser light provided by the present invention is also visible in relatively darkened areas, which is advantageous in structures which have not yet had electrical power installed.

Figure 3A:
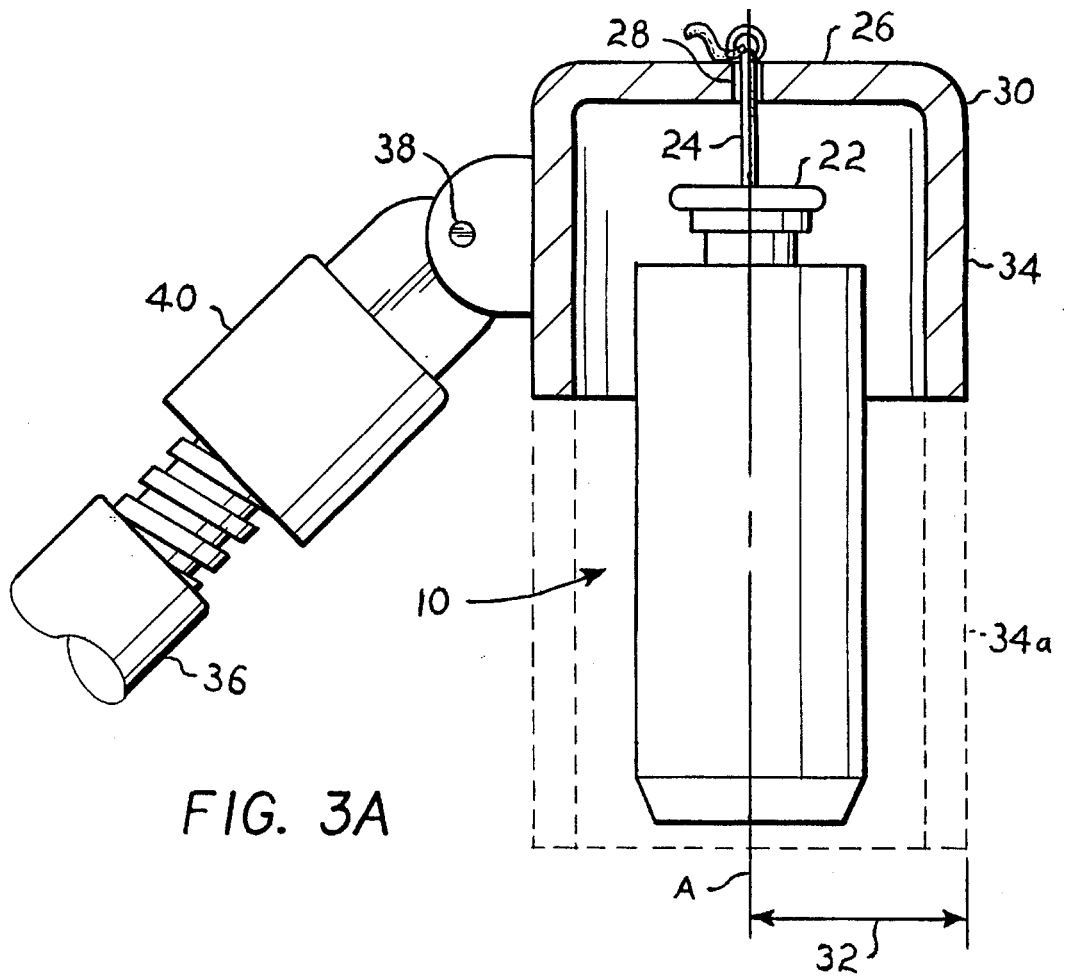
FIG. 3A is an elevation view in section of the present apparatus providing for the remote holding of the present laser plumb bob, so a single person may check a plumb line.
Figure 3B:
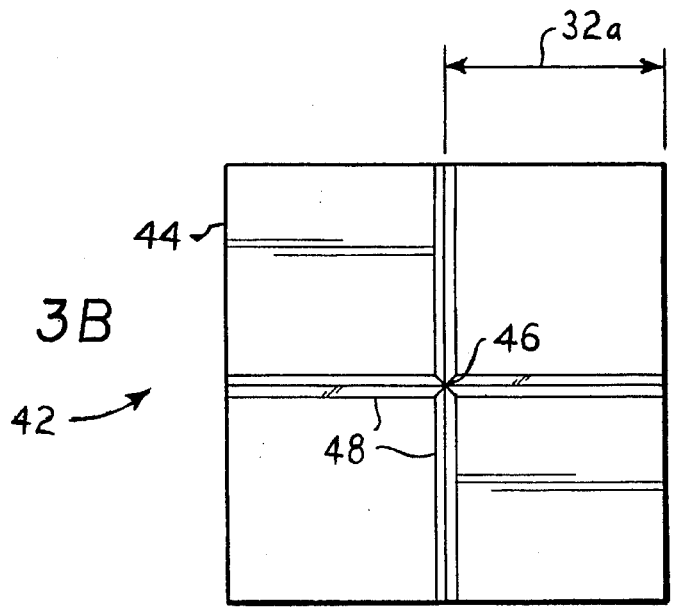
FIG. 3B is a target usable with the apparatus and plumb bob of FIG. 3A.

FIGS. 3A and 3B disclose an apparatus providing for the use of the present laser plumb bob 10 by a single person. In FIG. 3A, a plumb bob suspension plate or member 26 is shown in section and includes a passage 28 therethrough, which provides for the installation of a blumb bob line or string 24 therethrough to suspend the plumb bob 10 as described above. The member 26 has an edge 30 establishing a distance 32 between the edge 30 and the passage 28, with the longitudinal axis A of the plumb bob 10 aligned with the passage 28 and plumb bob suspension line 24 disposed therethrough.

The plumb bob suspension member 26 includes a shroud or windshield 34 depending therefrom, with the shroud or shield 34 being of the same width as the plumb bob suspension member 26. The shroud or shield may include an extension 34a extending downward a sufficient distance to completely surround a plumb bob suspended from the suspension member 26 by a short line 24, in order to better shield such a plumb bob and line from the wind or other effects, or alternatively a shorter shield 34 may be used to shield the string or line 24 itself, as desired.

An extension shaft or column 36 (shown completely in FIG. 4) is secured to the plumb bob suspension member 26 (or to the depending shield 34) by means of a pivot 38, permitting the column 36 to be held at varying angles relative to the suspension member 26, in order for the suspension member 26 to be held generally level. (It will be understood that slight angular deviations of the suspension member 26, and its shield or shroud 34/34a will not effect the accuracy of the plumb bob 10, due to its depending vertically from the central passage 28 and suspension line 24.) An extension fitting 40 provides for the attachment of the column 36.

Figure 4:
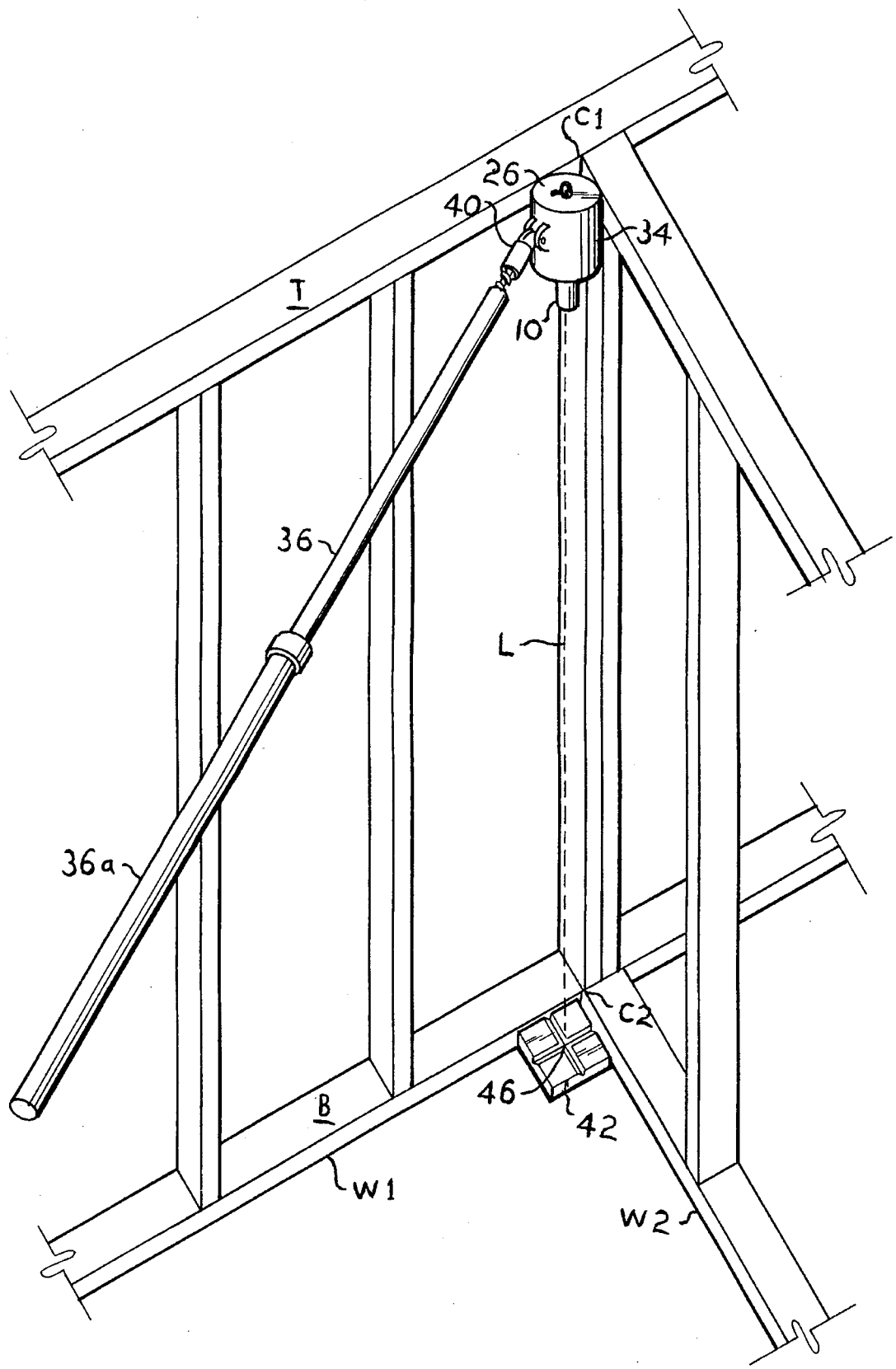
FIG. 4 is a perspective view of the laser plumb bob and apparatus of FIGS. 3A and 3B, in use providing a plumb line for a wall corner frame structure.

FIG. 3B discloses a plan view of the target 42 which is used in combination with the above plumb bob suspension member 26 and extension column 36, with their accompanying features. The target 42 has a peripheral edge 44 and a central target point 46 therein, with a distance 32a between the edge 44 and the target point 46 equal to the distance 32 between the edge 30 and the plumb line passage 28 of the plumb bob suspension member 26. The target point 46 may be defined by orthogonally placed grooves 48 each dividing the target equally, or by other means. As distance 32a of the target 42 and distance 32 of the plumb bob suspension member 26 are equal, it will be seen that the longitudinal axis A of the plumb bob (and a laser line L projected therefrom, as shown in FIG. 4) will precisely coincide with the target point 48, when the target 42 is placed vertically directly beneath the plumb bob suspension member 26. If desired, the target 42 may be coated or otherwise provided with a highly reflective and/or buffered surface, wherein the surface further removed from the central point 46 is less reflective, and/or reflects at a different angle, thereby providing maximum return of the laser beam only when centered on the target.

FIG. 4 provides a clearer view of the above described apparatus. In FIG. 4, a wall structure W1 is shown including a top plate T and a bottom plate B, with another wall structure W2 intersecting the first wall W1 and defining an upper corner C1 and a lower corner C2. The plumb bob suspension member 26, with the plumb bob 10 or the like suspended therefrom, is placed in contact with the walls W1 and W2 in the upper corner C1 by means of the extension column 36 (which may have a telescoping handle portion 36a). The target 42 is placed in the lower corner C2. Assuming that both of the walls W1 and W2 are perpendicular, the projected line L from the plumb bob 10 will strike the target 42 directly at the target point 46. The present invention may thus be used to plumb two intersecting walls simultaneously, or a single wall as desired, by only a single person.

Figure 5A:
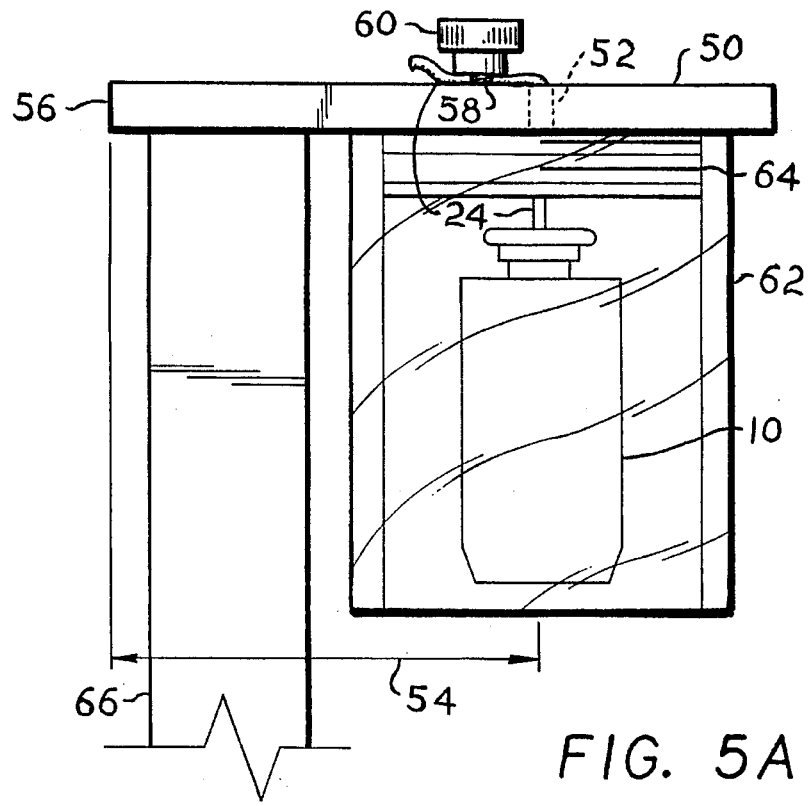
FIG. 5A is an elevation view of the upper end of the laser plumb bob and adjustable column therefor, showing its details.
Figure 5B:
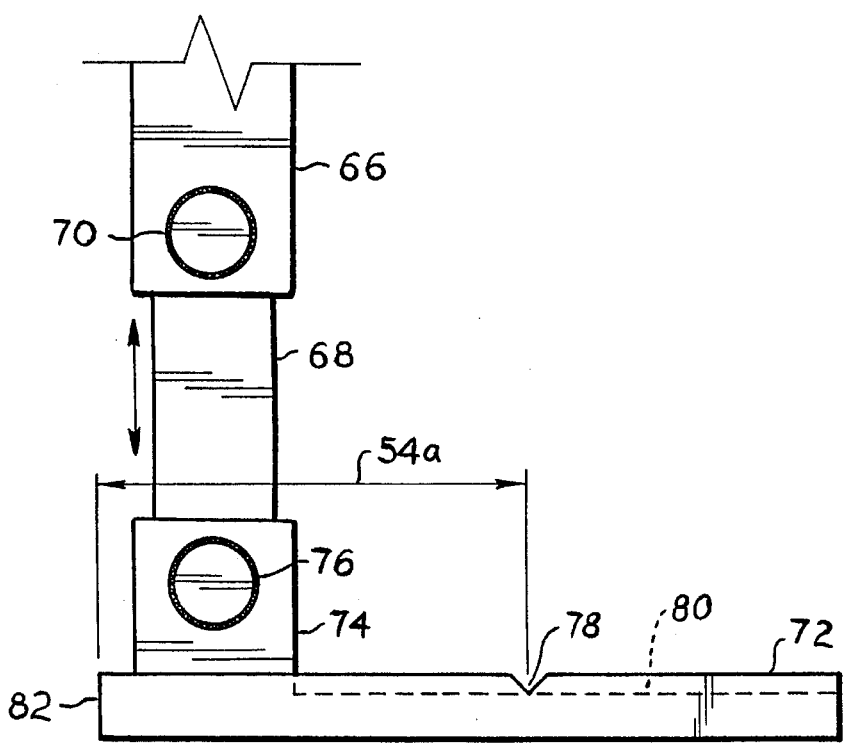
FIG. 5B is an elevation view of the lower end of the column of FIG. 5A, showing its details and telescoping mechanism.

FIGS. 5A and 5B disclose an alternative plumb bob extension means. In FIG. 5A, an upper plumb bob suspension plate or member 50 is shown, from which a plumb bob 10 may be suspended by means of a short plumb string or line 24, as in the embodiments discussed above. The line 24 passes through a plumb line passage 52, which passage 52 is formed through the plate or member 50 at a predetermined distance 54 from an edge 56, as in the embodiment of FIGS. 3A, 3B, and 4. The line 24 may be secured by means of a male threaded shaft 58 having a slot or passage therethrough, with a cooperating knob 60 threadedly tightening on the shaft 50 to clamp the line 24 between the plumb bob suspension plate or member 50 and the bottom of the knob 60. Other means, such as the retaining ring shown in FIG. 3A, may be used as desired.

The apparatus of FIG. 5A may also include a cylindrical shroud or wind shield 62, which shield 62 may be removably secured to the underside of the plumb bob suspension plate or member 50 by means of threads 64 formed on the underside of the member 50. The shield 62 may be of sufficient length to completely surround a plumb bob therein and suspended by a relatively short line 24, or alternatively may be of a shorter length, in the manner of the shield 34 of FIG. 3A. The shield 62 serves the same purpose as the shield 34/34a of FIGS. 3A and 4, i.e., serving to prevent unwanted oscillatory motion of the plumb bob or plumb bob suspension line due to wind or other environmental effects, when the present apparatus is used outdoors or in an uncompleted structure which is open to the outdoor environment.

An upper extension column 66 is rigidly secured normal or perpendicular to the underside of the plumb bob suspension plate or member 50, and serves to support the suspension member 50 (and a plumb bob suspended thereby) in order to plumb a wall or the like. The column 66 in turn fits and telescopes over a base column 68 (shown in FIG. 5B), which telescoping column portions 66 and 68 provide adjustment of the height of the plumb bob suspension member 50 according to the height of the wall or structure to be plumbed. The height adjustment may be locked at the length or height desired by means of a threaded column height locking or securing knob 70.

The base column 68 is in turn secured to a target plate 72, e.g. by means of a socket 74 formed thereon and a locking knob 76, or alternatively the base column 68 may be permanently affixed to the target plate 72 if disassembly is not required. The target plate 72 includes a target point 78 therein (more clearly shown in FIG. 6), which target point 78 may be defined by orthogonal grooves 80 formed in the upper surface of the target plate 72, or other means as desired. The target plate 72 has an edge 82, which edge 82 and target point 78 define a distance 54a therebetween which is equal to the distance 54 between the edge 56 and the plumb line passage 52 of the plumb bob suspension member 50 of FIG. 5A (and the longitudinal axis of a plumb bob suspended thereby). Thus, when the respective edges 56 and 82 of the plumb bob suspension member 50 and the target plate 72 are precisely vertically aligned with one another, the plumb line passage 52 of the suspension member 50 (and accordingly the plumb line 24 and plumb bob 10 with its longitudinal axis) and the target point 78 of the target plate 72 are correspondingly vertically aligned.

Figure 6:
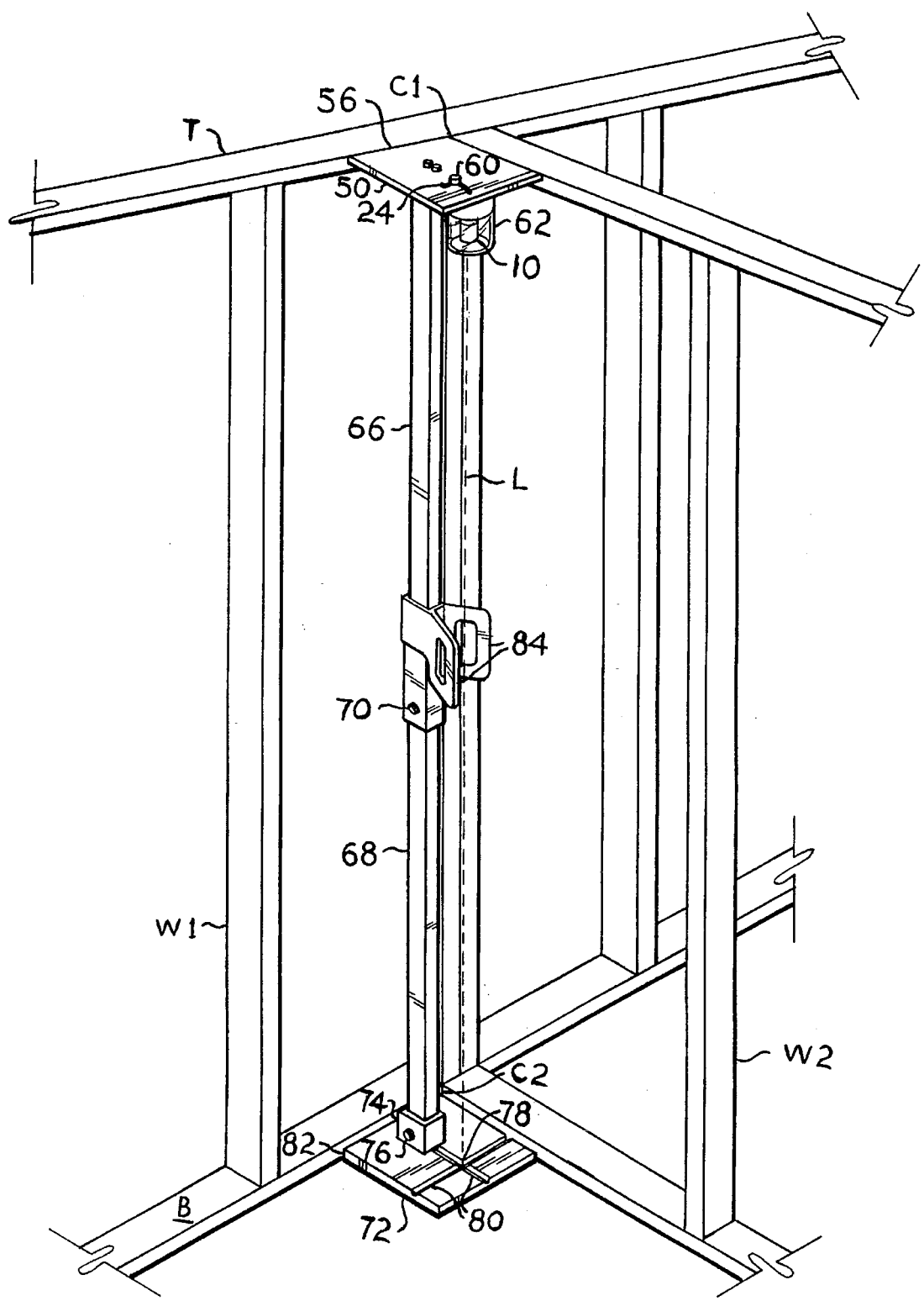
FIG. 6 is a perspective view of the laser plumb bob and column of FIGS. 5A and 5B, in use providing a plumb line for a wall corner frame structure.

FIG. 6 discloses a perspective view of the apparatus of FIGS. 5A and 5B in use. In FIG. 6, the plumb bob suspension member 50 is placed in contact with an upper corner C1 of walls W1 and W2, while the target plate is placed in the corresponding lower corner of the walls W1 and W2, similarly to the apparatus of FIG. 4 discussed above. The length of the telescoping upper and base column components 66 and 68 is adjusted in order to place the suspension member 50 adjacent the top plate T of the wall W1 when the target plate 72 is adjacent the bottom plate B. Handles 84 are provided on the column 66 for ease of handling the apparatus and placing it in position as desired. The two handles 84 are symmetrically offset laterally from the plumb line L established when the apparatus is vertical, in order to allow free passage of the plumb line or laser line L therebetween.

It will be seen that any slight angular play between the two extension column members 66 and 68 is of no consequence, as the plumb bob 10 is not rigidly secured to the suspension member 50, but is free to swing therefrom by means of the string or line 24. Thus, even if the upper column is not perfectly vertical, and thus the plumb bob suspension member or plate 50 is not perfectly horizontal, the plumb bob 10 will still be vertically aligned due to its freedom of movement. The accuracy of the present apparatus is not compromised to any appreciable degree, so long as the plumb bob suspension member or plate 50 is disposed generally horizontally. Accordingly, it will be seen that the various embodiments of the present invention require precision of assembly only for the laser device within the plumb bob body, and that the remaining apparatus may be assembled in the field and used without regard for extreme precision of assembly of the components.

While the present invention is primarily directed to a laser plumb bob 10 and apparatus providing for the use thereof by a single person, it will be seen that the apparatus embodiments of FIGS. 3a, 3B, 4, 5A, 5B, and 6 may be used with conventional plumb bobs suspended from a plumb line essentially the length of the wall height, with the lower end of the plumb bob in close proximity to the target. While the use of a conventional plumb bob fails to provide the conveniences of the present laser plumb bob (i.e., ability to be seen more readily in low light conditions, more rapid damping of oscillations, etc.) as explained above, the plumb bob apparatus may nevertheless be used with such conventional plumb bobs, thereby providing for their use by a single person and providing corresponding economies of operation during construction.

It will also be seen that, although FIGS. 4 and 6 of the drawings show the present apparatus being used to plumb a corner in a wall frame construction, thus simultaneously determining whether two adjoining walls are vertical, that the apparatus may just as easily be used to plumb a single wall.

It is to be understood that the present invention is not limited to the sole embodiments described above, but encompasses any and all embodiments within the scope of the following claims.

I claim:

1. A laser plumb bob and apparatus for the determination of a line over a vertical distance defined by an upper point and a lower point, comprising:

a plumb bob body having an upper end including plumb line attachment means, an opposite open lower end defining a length therebetween, a longitudinal axis concentric with said line attachment means and having a precisely vertical alignment when said plumb bob body is suspended from said line attachment means, and an interior cavity containing a laser device therein adapted to project a laser beam from said open lower end of said plumb bob body and coaxially aligned with said longitudinal axis and said line attachment means of said plumb bob body;

apparatus for the remote holding of said laser plumb bob, comprising an upper plumb bob suspension member having an edge and a plumb line passage therethrough at a predetermined distance from said edge, an extension column extending therefrom, a lower target with said target having an edge and having a central target point thereon at a predetermined distance from said target edge equal to said predetermined distance of said suspension member and aligned with said plumb line passage of said upper plumb bob suspension member when said edge of said target is aligned precisely with said edge of said upper plumb bob suspension member, and a short plumb line secured between said laser plumb bob and said suspension member and having a length substantially less than half of said vertical distance and adapted for the positioning of said laser plumb bob near said upper point of said vertical distance when said suspension member is placed adjacent said upper point, whereby;

said laser device projects a vertical laser line over the substantial majority of said vertical distance to said target when said laser plumb bob is suspended vertically by means of said short plumb line between said upper plumb bob suspension member and said plumb line attachment means and said target is placed below said laser plumb bob, with said vertical laser line hitting said target point precisely when said target is precisely aligned vertically below said upper plumb bob suspension member.

2. The laser plumb bob and apparatus of claim 1 wherein:
said length of said short plumb line is no greater than said length of said plumb bob body.

3. The laser plumb bob and apparatus of claim 1 wherein:
said upper plumb bob suspension member includes a vertical wall depending therefrom and extending downwardly to at least partially enclose said laser plumb bob therein when said laser plumb bob is suspended from said suspension member by said short plumb line.

4. The laser plumb bob and apparatus of claim 1 wherein:
said upper plumb bob suspension member includes a vertical wall depending therefrom and extending downwardly to completely laterally surround said laser plumb bob when said laser plumb bob is suspended from said suspension member by said short plumb line.

5. The laser plumb bob and apparatus of claim 1 wherein:
said upper plumb bob suspension ember includes a removable vertical wall depending therefrom and extending downwardly to surround said laser plumb bob when said laser plumb bob is suspended from said suspension member by said short plumb line.

6. The laser plumb bob and apparatus of claim 1 wherein:
said extension column is pivotally attached to said upper plumb bob extension member.

7. The laser plumb bob and apparatus of claim 1 wherein:
said extension column includes an upper end affixed normal to said upper plumb bob extension member, and a lower end affixed normal to said target, with said target lying parallel to said upper plumb bob extension member, whereby;

said extension column is placed against a wall to be plumbed with said edge of said upper plumb bob suspension member and a corresponding said edge of said target contacting the wall and said laser plumb bob is used to project a laser plumb line to said target to determine whether the wall is vertical.

8. The laser plumb bob and apparatus of claim 7 wherein:
said extension column is telescopingly adjustable.

9. The laser plumb bob and apparatus of claim 7 wherein:
said extension column includes handle means thereon.

10. The laser plumb bob and apparatus of claim 9 wherein:
said handle means comprises two handles symmetrically and laterally offset to provide a space therebetween adapted for the passage of said laser plumb line therethrough.

11. A laser plumb bob for the determination of a line over a vertical distance defined by an upper point and a lower point, comprising:

a plumb bob body having an upper end including plumb line attachment means, an opposite open lower end defining a length therebetween, a longitudinal axis concentric with said line attachment means and having a precisely vertical alignment when said plumb bob body is suspended from said line attachment means, and an interior cavity containing a laser device therein adapted to project a laser beam from said open lower end of said plumb bob body and coaxially aligned with said longitudinal axis and said line attachment means of said plumb bob body, and;

a short plumb line secured to said plumb line attachment means of said laser plumb bob and having a length substantially less than half of said vertical distance and adapted for the positioning of said laser plumb bob near said upper point of said vertical distance, whereby;

said laser device projects a vertical laser line over the substantial majority of said vertical distance when said laser plumb bob is suspended vertically from said plumb line attachment means by means of said short plumb line.

12. The laser plumb bob of claim 11 wherein:
said length of said short plumb line is no greater than said length of said plumb bob body.

13. A plumb bob apparatus for the determination of a line over a vertical distance defined by an upper point and a lower point, comprising:

an upper plumb bob suspension member having an edge and a plumb line passage therethrough at a predetermined distance from said edge, an extension column extending therefrom, a lower target with said target having an edge and having a central target point thereon at a predetermined distance from said target edge equal to said predetermined distance of said suspension member and aligned with said plumb line passage of said upper plumb bob suspension member when said edge of said target is aligned precisely with said edge of said upper plumb bob suspension member, whereby;

said plumb bob apparatus provides for the remote holding of a plumb bob thereby, with the plumb bob being suspended from said upper plumb bob suspension member to project a vertical line to said target when said target is placed below said upper plumb bob suspension member, with the vertical line being precisely concentric with said target point when said target is precisely aligned vertically below said upper plumb bob suspension member.

14. The plumb bob apparatus of claim 13 wherein:

said upper plumb bob suspension member includes a vertical wall depending therefrom and extending downwardly to at least partially enclose a plumb bob suspended from said upper plumb bob suspension member.

15. The plumb bob apparatus of claim 13 wherein:

said upper plumb bob suspension member includes a vertical wall depending therefrom and extending downwardly to completely laterally surround a blumb bob suspended from said upper plumb bob suspension member.

16. The plumb bob apparatus of claim 13 wherein:

said extension column is pivotally attached to said upper plumb bob extension member.

17. The plumb bob apparatus of claim 13 wherein:

said extension column includes an upper end affixed normal to said upper plumb bob extension member, and a lower end affixed normal to said target, with said target lying parallel to said upper plumb bob extension member, whereby;

said extension column is placed against a wall to be plumbed with said edge of said upper plumb bob suspension member and a corresponding said edge of said target contacting the wall and a plumb bob is used to project a plumb line to said target to determine whether the wall is vertical.

18. The plumb bob apparatus of claim 17 wherein:

said extension column is telescopingly adjustable.

19. The plumb bob apparatus of claim 17 wherein:

said extension column includes handle means thereon.

20. The plumb bob apparatus of claim 19 wherein:

said handle means comprises two handles symmetrically and laterally offset to provide a space therebetween adapted for the passage of a plumb line therethrough.

* * * * *